United States Patent
Vorsatz et al.

(10) Patent No.: US 10,940,589 B2
(45) Date of Patent: Mar. 9, 2021

(54) HAPTIC SYSTEM AND OPERATING METHOD

(71) Applicant: Technische Universität Berlin, Berlin (DE)

(72) Inventors: Thomas Vorsatz, Neuenhagen (DE); Boris Beckmann-Dobrev, Berlin (DE)

(73) Assignee: Technische Universität Berlin, Berlin (DE)

( * ) Notice: Subject to any disclaimer, the term of this patent is extended or adjusted under 35 U.S.C. 154(b) by 207 days.

(21) Appl. No.: 15/303,905

(22) PCT Filed: Apr. 17, 2015

(86) PCT No.: PCT/DE2015/100163
§ 371 (c)(1),
(2) Date: Oct. 13, 2016

(87) PCT Pub. No.: WO2015/158336
PCT Pub. Date: Oct. 22, 2015

(65) Prior Publication Data
US 2017/0036348 A1    Feb. 9, 2017

(30) Foreign Application Priority Data

Apr. 17, 2014  (DE) .................. 10 2014 105 538

(51) Int. Cl.
*B25J 9/16*   (2006.01)
*G06F 3/03*   (2006.01)
(Continued)

(52) U.S. Cl.
CPC .......... *B25J 9/1689* (2013.01); *B25J 13/025* (2013.01); *G05B 19/41875* (2013.01);
(Continued)

(58) Field of Classification Search
CPC .. B25J 9/1689; G06F 3/03; G06F 3/01; G06F 3/016; G05B 2219/40137; G05B 2219/36455
See application file for complete search history.

(56) References Cited

U.S. PATENT DOCUMENTS 5,821,920 A  * 10/1998  Rosenberg ........... G05B 19/409
                                                    345/156
5,923,139 A  *  7/1999  Colgate .................. B25J 9/1656
                                                    318/566
(Continued)

FOREIGN PATENT DOCUMENTS

CN           101439514 A     5/2009

OTHER PUBLICATIONS

International Preliminary Report on Patentability and Written Opinion dated Oct. 27, 2016 pertaining to PCT/DE2015/100163 filed Apr. 17, 2015.

(Continued)

*Primary Examiner* — Ian Jen
(74) *Attorney, Agent, or Firm* — Dinsmore & Shohl, LLP

(57) ABSTRACT

The application relates to a haptic system comprising a haptic device that has an end effector terminal and a transmission structure which can generate a translational movement as an output variable, said translational movement extending from the transmission structure to the end effector terminal via a boom such that the end effector terminal moves in a manner that is perceptible to a user, the transmission structure being formed by means of driven linear shafts. The application further relates to a method for operating a haptic system comprising a haptic device.

12 Claims, 5 Drawing Sheets

Figure 1:
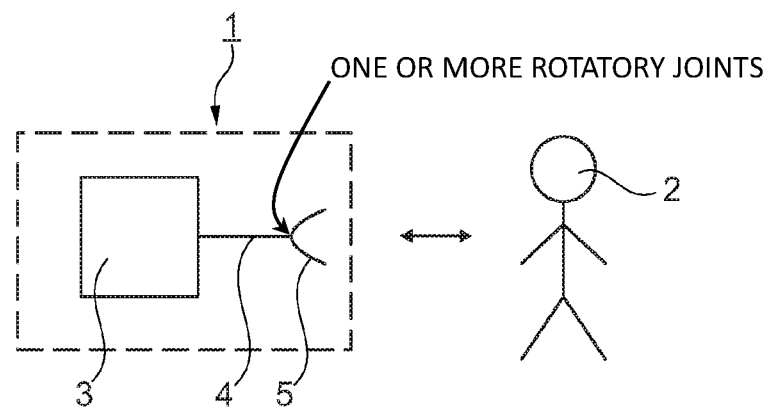

(51) Int. Cl.
  *G06F 3/0346* (2013.01)
  *G05B 19/418* (2006.01)
  *G07C 3/14* (2006.01)
  *B25J 13/02* (2006.01)
  *G06F 3/01* (2006.01)
(52) U.S. Cl.
  CPC ............... *G06F 3/016* (2013.01); *G06F 3/03* (2013.01); *G06F 3/0346* (2013.01); *G07C 3/14* (2013.01); *G05B 2219/36455* (2013.01); *G05B 2219/40137* (2013.01); *G05B 2219/40619* (2013.01)

(56) References Cited

U.S. PATENT DOCUMENTS

| | | | |
|---|---|---|---|
| 5,952,796 A | 9/1999 | Colgate et al. | |
| 6,046,563 A * | 4/2000 | Moreyra | G08B 6/00 340/407.1 |
| 6,429,849 B1 * | 8/2002 | An | G05G 9/047 345/161 |
| 2005/0093821 A1 * | 5/2005 | Massie | G06F 1/206 345/161 |
| 2006/0106369 A1 * | 5/2006 | Desai | A61B 34/76 606/1 |
| 2007/0018958 A1 * | 1/2007 | Tavakoli | B25J 3/04 345/161 |
| 2011/0115754 A1 * | 5/2011 | Cruz-Hernandez | G05G 1/08 345/184 |
| 2011/0264018 A1 * | 10/2011 | Matjacic | A61H 1/0274 601/40 |
| 2013/0194083 A1 * | 8/2013 | Rao | G06F 3/016 340/407.1 |
| 2013/0229272 A1 * | 9/2013 | Elliott | G05G 9/047 340/407.2 |

OTHER PUBLICATIONS

International Search Report completed Oct. 6, 2015 pertaining to PCT/DE2015/100163 filed Apr. 17, 2015.

* cited by examiner

HAPTIC SYSTEM AND OPERATING METHOD

The invention relates to a haptic system and a method for operating a haptic system.

BACKGROUND

The constantly increasing possibilities for presenting mixed, virtual or just enriched reality as well as the increasing speed in product development with additionally rising complexity and growing integration of further domains in the field of mechatronics require, that in the interests of evaluating previous developments, with evaluation taking place as early as possible in the process chain of (virtual) product development, and in the interests of evaluating demand, hedging opportunities are proposed, which are expanded by interaction devices, which apart from inputs also requires haptic outputs to the user, in order to bring the quality of experience closer to that of real situations. Apart from established devices new ones are constantly being developed, which are either very cost-effective or which offer more interaction space and/or greater interaction forces compared to what has been available up to now.

Apart from haptic systems, in which an end effector terminal is guided and accelerated by the user's manual power, complex scenarios of virtual product creation also call for device solutions for haptic systems, which can, on their own, map mechanical operations. Such a haptic type of device shall for example be able, based on a mechatronic model, to imitate, by a mechanical movement of the end effector, the opening and closing of an automatic car door, whilst, at the same time, allowing the user to intervene directly, i.e. to for example stop or in other ways influence the opening operation by exerting a force on the end effector.

The objective in using haptic devices consists in that the user shall be able to interact with the machine or the computer in that his perception is deceived. The haptic device generates stimuli as outputs, and experiences for example, forces or shifts as inputs.

The human-system-interaction, which in the following shall serve as a grouping of the terms man-machine-interaction and human-computer-interaction—terms which at any rate are difficult to separate these days—describes the interdependence of the technical system and the human being in interactive applications. Many design principles and rules have to be observed for the development of machines which are to be operated by man, and this includes the haptic devices discussed in the next section. In summary a best possible ergonomics, i.e. the best possible fulfillment of ergonomic requirements, takes first place among the design objectives.

Haptics or haptic perception acts on the human apparatus of the senses. One of the frequently used haptic devices nowadays is the mobile telephone which, by means of whole body vibration, signals a telephone call or confirms inputs on the touch display. The term haptics is used as the generic term of the four types of feeling (or sense), which in detail are sense of touch, heat perception, sense of balance and the sensitivity and motoric activity based on the kinaesthesia of the muscles, joint and tendons. The first one, also called tactile perception, and the last one shall be focussed on for further observations. These two types of perception are to be served primarily by haptic devices. Often heat perception is associated with tactile perception and the sense of balance is associated with kinaesthetic perception. Admittedly heat sources on haptic devices as well as on devices such as e.g. movable platforms or seats for the user, which address the sense of balance, are feasible, but most of the devices offered on the market primarily act on the first two.

Disciplines of research into haptics include service-orientated research (haptic metrology), basic research (haptic perception) and applied research (haptic synthesis). Haptic metrology is engaged in standardisation, force determination, vibration measurement as well as in movement, speed and acceleration measurement techniques. Haptic perception can be divided into psychophysics and neurobiology. Psychophysics comprises the perception of maximum and minimum forces, absolute threshold values, resolution and dependencies as well as dynamics. Furthermore psychophysics comprises interactions, for example strategies and spontaneous reactions. Neurobiology refers to receptors in type and density, relationships between receptors and combined perception, nerve transfer, location of information processing, operations in information processing as well as reactions. Haptic synthesis is divided into virtual reality and tele-manipulation. Virtual reality comprises hardware interfaces such as tactile interfaces, kinaesthetic interfaces, information processing, actuators and kinematic designs; software simulation for algorithmics, graphics, haptics and augmented reality as well as control engineering for time-discrete systems. Tele-manipulation also comprises hardware interfaces such as tactile interfaces, kinaesthetic interfaces, actuators and kinematic designs. Further, tele-manipulation comprises hardware interfaces, for example for force determination, control engineering for feedback systems, tele-presence, communication and delay times. There are many varied interdependencies between the disciplines of research into haptics and their fields.

Document DE 10 2005 003 513 A1 discloses a mobile haptic interface, in particular for large-scale tele-presence. The interface comprises at least one manipulator with an end effector for the handover of haptic information between user and manipulator. At the other end of the manipulator a reference point is arranged in the user environment in a stationary manner. The manipulator consists of a multi-language handling device, which is suitable for bridging the large-scale distance between user and the stationary point.

SUMMARY

It is the objective of the invention to propose a haptic system as well as a method for operating a haptic system, in which a large work space with high dynamics is provided for a haptic interaction with the user. It shall be possible to provide large forces and a high spatial resolution.

This objective is achieved by means of a haptic system according to independent claim 1 as well as a method for operating a haptic system according to independent claim 13. Further designs are the subject of dependent sub-claims.

According to one aspect a haptic system with a haptic device is proposed, which comprises an end effector terminal and a transmission structure. Using the transmission structure an output variable can be generated which is a translational movement, wherein the translational movement is extended from the transmission structure via a boom and supplied to the end effector terminal coupled to the boom. As a result the end effector terminal can be moved, for example in a translational manner, which is perceivable by a user. The transmission structure comprises driven linear shafts.

According to a further aspect a method for operating a haptic system with a haptic device is proposed. The haptic device has an end effector terminal and a transmission structure. With the method a translational movement is generated as an output variable by means of the transmission structure. The end effector terminal is moved in a translational manner in accordance with the output variable, in that the translational movement is extended by the transmission structure via a boom out of the transmission structure and supplied to the end effector terminal. During generation of the translational movement in the transmission structure driven linear shafts are used.

In one embodiment three driven linear shafts are provided. With this or other designs a driven linear movement takes place along the linear shafts provided in the transmission structure. Provision may be made for a serial kinematics or a parallel kinematics in the transmission structure. The term driven linear shaft as used in here refers to a spatial axis, along which a linear shift is provided by means of an associated drive in the haptic device.

Serial kinematics are consecutive arrangements of links which are connected with each other by joints and can be driven by actuators. Movement of a link nearer the frame leads to a movement of links more remote from the frame. This may result in the disadvantage that each shaft nearer the frame perceives the masses and inertias of the links and actuators more remote from the frame as inertia and possibly as weight force with an associated loss in dynamics. Moreover movement of the last link, i.e. usually the end effector terminal point, is an overlay of the movement of a number of links, as a result of which control and regulation is made distinctly more difficult. One structural shape consisting of driven rotational joints may lead to non-linear transmissions and thus to positional dependencies of the transferable forces and moments. Straight positions usually lead to a considerable force reduction. With certain transmission structures the uniqueness of how the system reacts to position settings set by the user may get lost. With parallel kinematics a number of joints are usually fixedly arranged on the frame. There is no need for providing links and actuators more remote from the frame so that the dynamics is generally improved (impedance is lowered) or structural masses and drive power can be reduced. Frequently one degree of freedom (of the end effector terminal point, i.e. the last moved link) may be associated with exactly one actuator (degree of freedom), which simplifies computation of the control settings. A combination of links, wherein some are arranged in parallel and others in series, results in a hybrid dynamics (hybrid transmission).

The haptic device quite generally serves to provide a translational movement, which can be coupled to the end effector terminal, in order to shift the same in a translational manner such, that this is perceivable or detectable by a user, who for example touches the end effector terminal. Insofar the haptic device provides an output variable, without necessarily having an input variable.

Haptic devices form the interface between man and virtual simulation. They can be effective in a sensor-motoric, full-duplex, bi-directional manner exactly like the haptic sense itself. The input variable of a haptic device reflects the output variable of the user's hand. This input/output variable may be a time-dependent function, which quantifies the change in position, speed and the force of a user's hand/of the end effector. It is called a man-machine control loop or man-computer-control loop if the haptic device outputs an adequate output variable in connection with an input variable.

Forward and inverse kinematics of the proposed system are unequivocally determined.

Some of the information about anthropometric variables, forces, moments, speeds and/or frequencies, which is relevant to the construction, varies a great deal. One can differentiate between tactile and kinaesthetic requirements. Tactile stimuli require forces in the range from 0.005-5 N at frequencies of 10-10,000 Hz and for deflections of 1 µm-1 mm, or are still noticeable at this level. The upper limit for the perception range of kinaesthetic stimuli according to DIN EN ISO 9241-910 lies between 20-30 Hz. The bandwidth of body movements which can be taken into account during the kinaesthetic input lies at 5-10 Hz for fingers, at 1-2 Hz for unexpected arm movements, and at 2-5 Hz for periodic arm movements. Reflex-type movements can be taken into account up to 10 Hz.

In order to meet the high demands in terms of high-frequency mechanical actions for the tactile sensations, it may be necessary to divert to additional degrees of freedom, for the example in the form of vibrators within the gripping range. It may be possible that the mechanical components which address the kinaesthetic cannot be moved with higher frequencies.

Three driven linear shafts can extend along the axes of an orthogonal coordinate system. Therefore the driven linear shafts extend along an orthogonal coordinate system.

Figure 6:
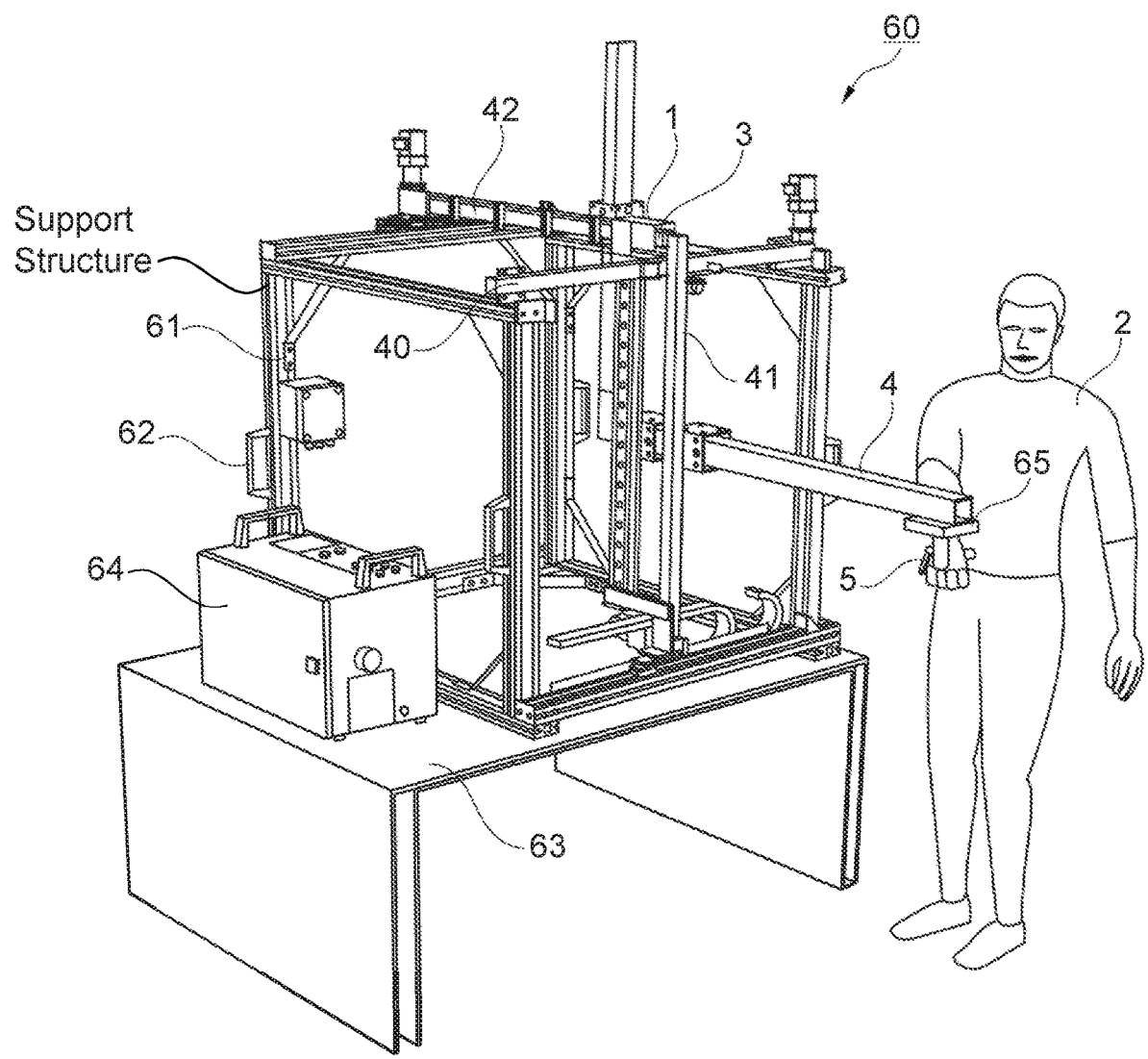

With one embodiment provision may be made for the driven linear shafts to be received in a support structure (FIG. 6). The support structure may comprise one or more elements, which at least in part may be connected among each other, for example by means of screw connections or magnetic connections.

One or more elements of the support structure may extend in longitudinal direction of the driven linear shafts.

One or more guiding shafts may be formed using the support structure.

One design may provide for each of the driven linear shafts to be formed by a rail and a carriage shiftable thereon in longitudinal direction of the rail. The rails may be mechanical, for example in order to relieve the linear shafts and to block unwanted rotations.

The transmission structure may have one or more rotatory joints. One or more rotatory joints may be useful in providing additional degrees of freedom of movement in the transmission structure. Rotatory joints (with sensors, with or without actuators) may be additionally attached as an extension of the end effector terminal, in order to make additional provision for up to three rotatory degrees of freedom. Further degrees of freedom (rotatory or translational) may be provided in order to map the gripping. These are attachments which can be independently attached to the haptic device.

It is possible to couple a haptic controller to the device. Using the haptic controller, one or more input variables can be provided, which are supplied to the haptic device. Provision may be made to prepare data regarding a haptic interaction with the user and to therefrom derive control signals for the haptic device. The haptic controller may be implemented using one or more software modules, which (i) may provide a user input (via the end effector) into the simulation, without numerical levering/adjusting; (ii) may provide collision forces from the simulation to the user (via the end effector) such that he perceives them as being real; (iii) may operate at approx. 1000 Hz, and/or (iv) may stabilise the man-machine-control loop as a whole.

Provision may be made for a position and/or speed determination device, which is adapted to determine a spatial position of the end effector operated by the user. With the aid of the position determination device a sensor system for determining the spatial position of the end effector terminal is provided based on it being operated by the user. This information may be supplied for processing to the haptic controller in the form of position determination data. The haptic controller can use this data to control position, force or speed on the haptic device. The input of the user of the simulation may be provided.

One embodiment can make provision for a force determination device to be provided which is adapted to determine forces and/or moments occurring on the end effector terminal. Additionally or alternatively to the sensor system for determining the spatial position of the end effector terminal, a sensor system is provided by means of the force determination device, in order to determine the forces applied by the user to the end effector terminal. Information on the detected forces at the end effector terminal can be transferred to the haptic controller by means of data. This data may be called force-sensing data. The generation of control signals in the haptic controller can then be effected by evaluating the force-sensing data, so that the translational movement generated by means of the transmission structure can be performed taking into account the forces determined at the end effector terminal.

Provision may be made for a force generation device, which is adapted to control a mechanical resistance on the end effector terminal. Force generation can be effected with the aid of one or more actuators. The force, i.e. the extent of occurring forces which are perceived by the user at the end effector terminal, and which are provided during the translation movement of the end effector, can be controlled. An admittance control or impedance control can be provided. Depending on how large the device is, the user must apply an inordinate amount of force in order to shift the end effector. Admittance control may be meaningful, especially for large and sluggish devices.

With one embodiment provision may be made for providing a haptic simulator, which is adapted to simulate an interaction with a virtual object. The simulator can be coupled functionally to the haptic controller, wherein a digital or analogue coupling may be provided. A serial chain of the following kind may be formed: simulator haptic controller haptic device with transmission structure, boom and end effector. The haptic simulator may be formed with the aid of a data processing device. On the data processing device a software module may be executed which simulates a virtual object as well as the interaction therewith. Data relating to an interaction can be supplied by the haptic controller to the haptic simulator, which on the basis of the simulated virtual object determines output data which are returned to the haptic controller. Haptic simulators for different virtual objects are known as such in various designs.

The designs described above in association with the haptic system may be provided in connection with the method for operating a haptic system with the haptic device, correspondingly.

The haptic device may be adapted to remotely control robots which carry out work controlled by man in nuclear reactors, in mine fields, in space or under water.

DESCRIPTION OF EXEMPLARY EMBODIMENTS

Figure 2:
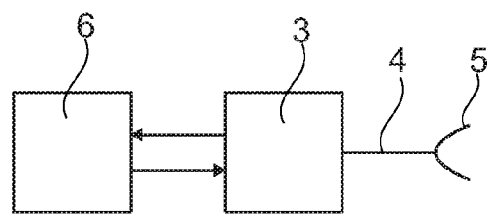
Figure 3:
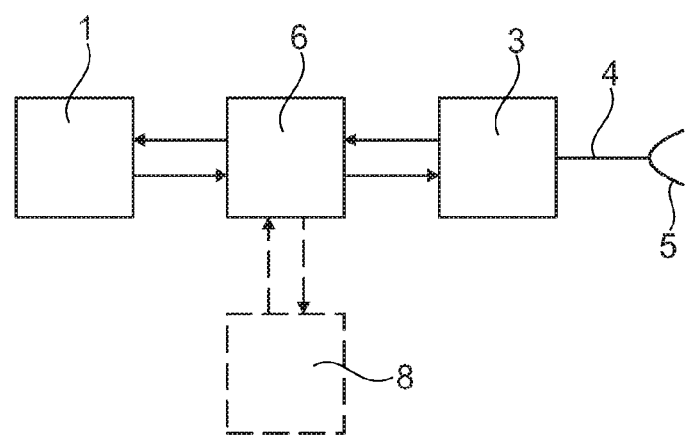
Figure 4:
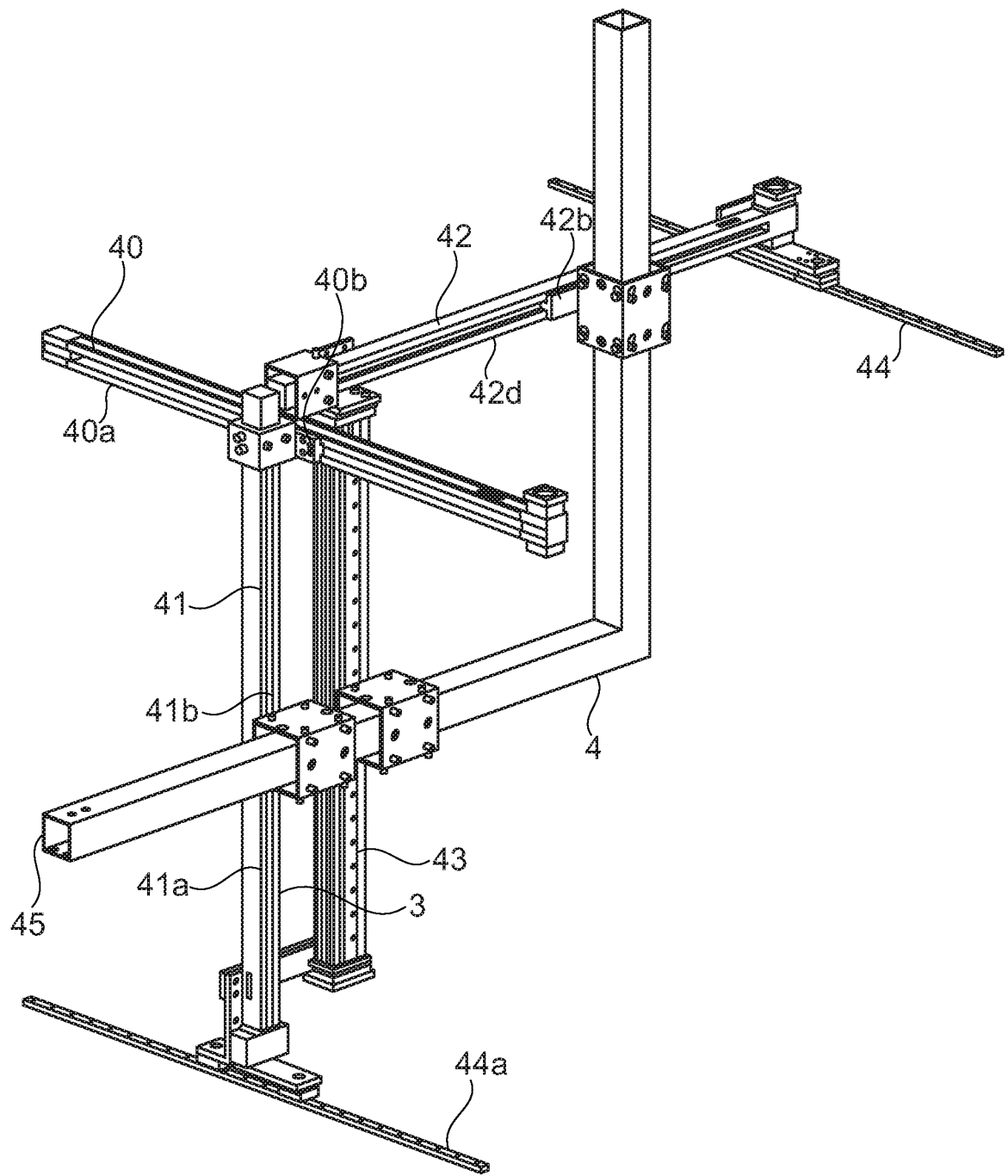
Figure 5:
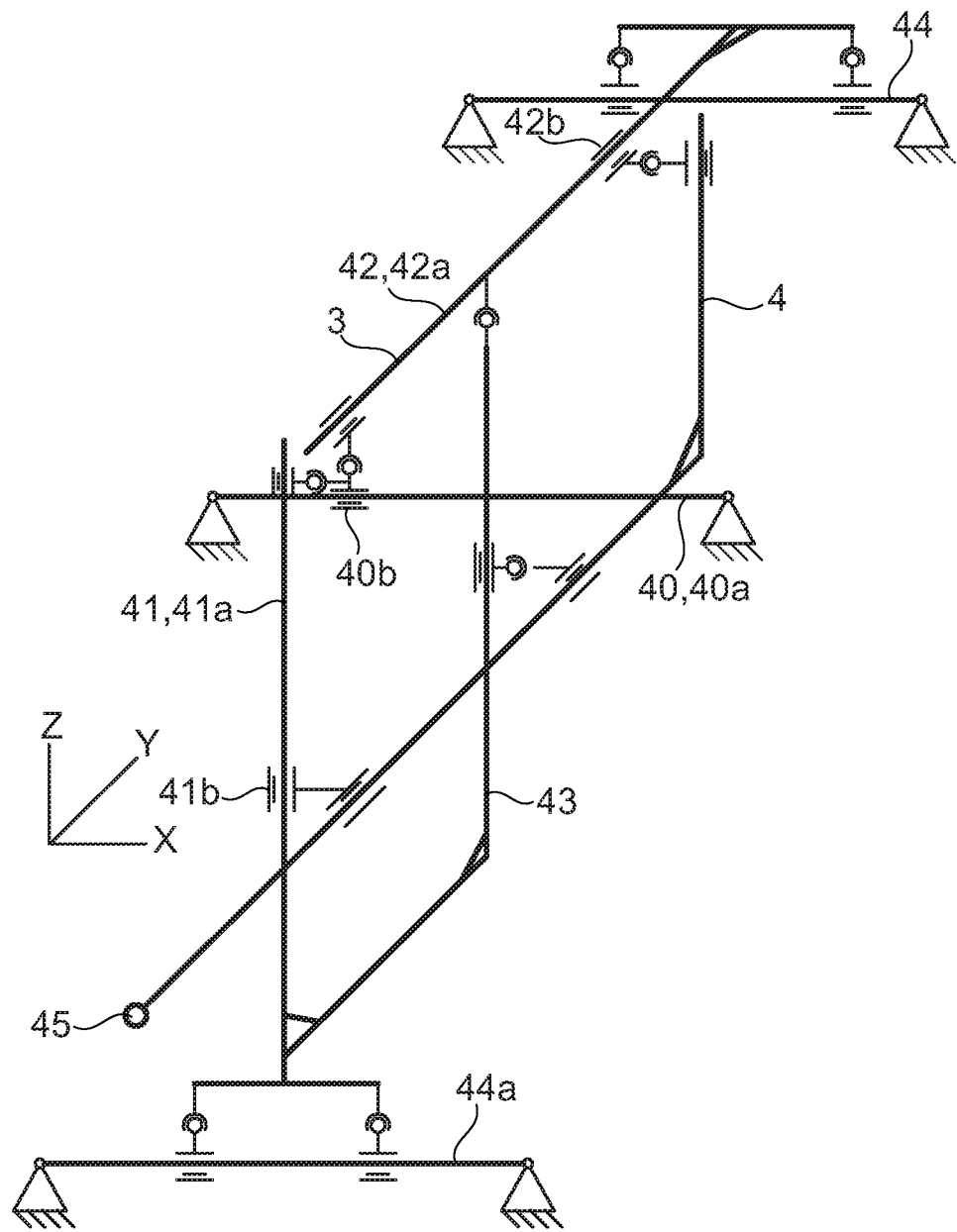
Figure 7:
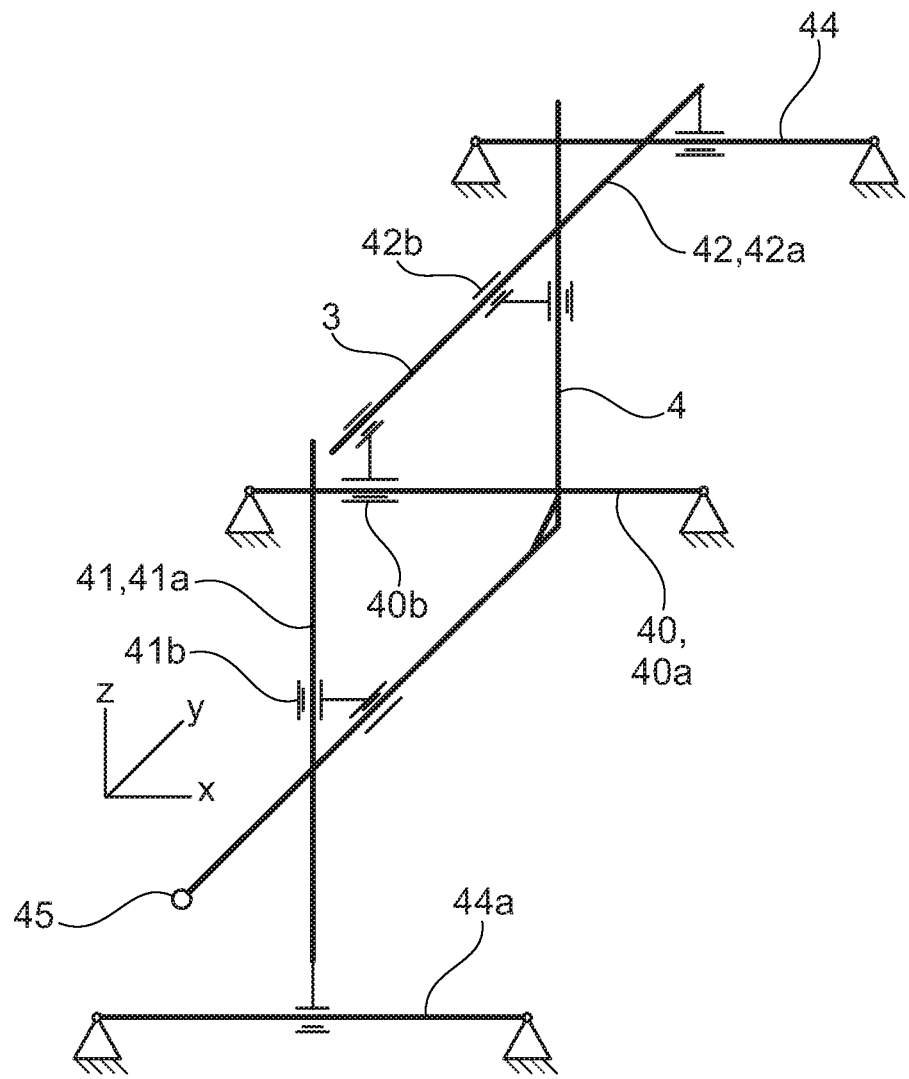

The exemplary embodiments will now be explained in detail with reference to figures of a drawing, in which FIG. 1 shows a schematic view of a haptic device, FIG. 2 shows a schematic view of a haptic system, in which a haptic device is coupled to a haptic controller, FIG. 3 shows a schematic view of a haptic system, in which a haptic manipulator and/or a haptic simulator are coupled to the haptic controller, FIG. 4 shows a schematic view of a haptic device with a transmission structure with driven linear shafts and an end effector, to which an output variable (translational movement) of the transmission structure is supplied via a boom, FIG. 5 shows a schematic view of the haptic device of FIG. 4, FIG. 6 shows a schematic view of a haptic system using the arrangement with transmission structure, boom and end effector terminal of FIG. 4, and FIG. 7 shows a schematic view of a further embodiment of the transmission structure of a haptic device.

FIG. 1 shows a schematic view of a haptic device 1, which is designed to provide an output variable, which is perceptible by a user 2. With the embodiment shown the output variable is a translational movement provided by a transmission structure 3 and supplied via a boom 4 extending out of the transmission structure 3 to the end effector terminal 5, which can be grasped by the user 2 for example with one hand. The translational movement of the end effector terminal 5 may be a spatial movement. The transmission structure 3 may have one or more rotator joints. One or more rotatory joints may be useful in providing additional degrees of freedom of movement in the transmission structure 3. Rotatory joints (with sensors, with or without actuators) may be additionally attached as an extension of the end effector terminal 5, in order to make additional provision for up to three rotatory degrees of freedom. Further degrees of freedom (rotatory or translational) may be provided in order to map the gripping. These are attachments which can be independently attached to the haptic device 1.

FIG. 2 shows a haptic system, where the haptic device 1 with transmission structure 3, boom 4 and end effector terminal 5 is coupled to a haptic controller 6 such that signals provided by the haptic controller 6 for generating the output variable (translational movement) are processed in the haptic device 1.

With the haptic system in FIG. 3 a (tele-) manipulator 7 and/or a haptic simulator 8 are coupled to the haptic controller 6. The (tele-) manipulator 7 may be formed with a position determination device and/or a force determination device (not shown), with which a respective sensor system can be provided for determining the spatial position of the end effector 5 and for determining forces on the end effector terminal 5. Based on the recorded measured data the haptic controller 6 can, taking into account the determined spatial position and/or the force situation recorded on the end effector terminal 5, generate control signals for the transmission structure 3 on the haptic device 1.

FIG. 4 shows a schematic view of an embodiment of the transmission structure 3 of the haptic device 1, on which driven linear shafts 40, 41, 42 are provided, each of which comprises a guiding shaft 40a, 41a, 42a as well as a driven carriage 40b, 41b, 42b shiftably arranged thereon. In the example shown an orthogonal (e.g. Cartesian) coordinate system is thereby created with the aid of the driven linear shafts 40, 41, 42. Furthermore provision is made for supporting guiding shafts 43, 44, 44a. The transmission structure 3 is coupled to the boom 4, which extends out of the transmission structure 3 and provides a coupling point 45 for the end effector terminal 5. This ensures a translational movement of the end effector terminal 5, the movement being generated as an output variable by the transmission structure 3, thereby allowing the end effector terminal 5 to be shifted in a translational manner, which is a shift perceptible by the user 2.

FIG. 5 shows a schematic view of the transmission structure of FIG. 4.

FIG. 6 shows a schematic view of a haptic system 60 using the transmission structure 3 with the driven linear shafts 40, 41, 42.

The transmission structure 3 is received in a frame structure 61, on which carrying handles 62 are provided. The frame structure 61 is arranged on a base 63 which also has a control cabinet 64 arranged on it, which contains controlling, regulating and/or power elements.

In the embodiment shown the haptic system 60 comprises supporting rails with a ball rail system. A force determination device 65 is provided on the end effector terminal 5.

FIG. 7 shows a schematic view of a simplified embodiment of the transmission structure 3 of the haptic device 1. Compared to the embodiment shown in FIGS. 4 and 5 the transmission structure 3 does not have a supporting guiding shaft 43. The other components essentially correspond to the components shown in FIGS. 4 and 5, so that the same reference symbols have been used here.

The features disclosed in the above description, the claims and the drawing may be of importance both singly and in any combination for realising the different embodiments.

The invention claimed is:

1. A haptic system having a haptic device which comprises an end effector terminal and a transmission structure, the transmission structure generates a translational movement as an output variable, said translational movement extends, in a horizontal direction, from the transmission structure to the end effector terminal via a horizontally aligned portion of an L-shaped boom such that the end effector terminal moves according to the output variable, the transmission structure being formed by driven linear shafts, which are received in a support structure, and the boom being coupled to at least one of the driven linear shafts.

2. The haptic system according to claim 1, wherein three driven linear shafts extend along the axes of an orthogonal coordinate system.

3. The haptic system according to claim 1, wherein one or more elements of the support structure extend in longitudinal direction of the driven linear shafts.

4. The haptic system according to claim 2, wherein the support structure is formed with one or more guiding shafts.

5. The haptic system according to claim 1, wherein the driven linear shafts are each formed with a rail and a carriage shiftable thereon in longitudinal direction of the rail.

6. The haptic system according to claim 1, wherein the transmission structure comprises one or more rotatory joints.

7. The haptic system according to claim 1, wherein a haptic controller is coupled to the haptic device.

8. The haptic system according to claim 1, wherein a position and/or speed determination device is provided, which is adapted to determine a spatial position of the end effector terminal operated by the user.

9. The haptic system according claim 1, wherein a force determination device is provided, which is adapted to determine forces and/or moments occurring on the end effector terminal.

10. The haptic system according to claim 1, wherein a force generation device is provided which is adapted to control forces introduced into the end effector terminal during translational movement.

11. The haptic system according to claim 1, wherein a haptic simulator is provided, which is adapted to simulate an interaction with a virtual object.

12. A method for operating a haptic system with a haptic device, which comprises an end effector terminal and a transmission structure, wherein the method comprises the following steps:
generating a translational movement as an output variable of the transmission structure and
moving the end effector terminal in a translational manner by extending, in a horizontal direction, the output variable out of the transmission structure to the end effector terminal via a horizontally aligned portion of an L-shaped boom,
wherein the transmission structure being formed by driven linear shafts, which are received in a support structure, with the boom being coupled to at least one of the driven linear shafts, are utilized for generating the output variable.

* * * * *